(12) United States Patent  
Tran

(10) Patent No.: US 8,316,970 B1
(45) Date of Patent: Nov. 27, 2012

(54) HYDRAULIC-BASED SPHERICAL ROBOT

(75) Inventor: Nghia X. Tran, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 109 days.

(21) Appl. No.: 13/022,204

(22) Filed: Feb. 7, 2011

(51) Int. Cl.
*B25J 11/00* (2006.01)
(52) U.S. Cl. ............................................. 180/7.1; 901/1
(58) Field of Classification Search .................... 180/7.1; 901/1, 22
See application file for complete search history.

(56) References Cited

U.S. PATENT DOCUMENTS

| | | | |
|---|---|---|---|
| 7,963,350 B1 * | 6/2011 | Thielman et al. ............... | 180/7.1 |
| 8,156,919 B2 * | 4/2012 | Darrow ........................... | 123/243 |
| 2004/0182614 A1 * | 9/2004 | Wakui ............................. | 180/7.1 |
| 2008/0083571 A1 * | 4/2008 | Troy ............................... | 180/7.1 |
| 2009/0099709 A1 * | 4/2009 | Troy ................................. | 701/1 |
| 2012/0059523 A1 * | 3/2012 | Salter et al. .................... | 700/281 |

* cited by examiner

*Primary Examiner* — Tony Winner
(74) *Attorney, Agent, or Firm* — Ryan J. Friedl; Kyle Eppele

(57) ABSTRACT

A system includes a plurality of fluid chambers uniformly distributed about and in fluidic connection with a fluid reservoir, each fluid chamber having a valve and pressure sensor adjacent thereto, the valve configured to allow fluid flow between the fluid reservoir and the fluid chamber and the pressure sensor configured to determine the amount of fluid within the respective fluid chamber; means, adjacent to the fluid reservoir, for pumping fluid between the fluid reservoir and each of the fluid chambers; and a controller configured to control the means for pumping fluid and the valves using data from the pressure sensors. The means for pumping fluid, the valves, the pressure sensors, and the controller are contained within an inner housing and the plurality of fluid chambers are contained within an outer housing, which may be spherical in shape, and are external to the inner housing.

20 Claims, 3 Drawing Sheets

HYDRAULIC-BASED SPHERICAL ROBOT

FEDERALLY-SPONSORED RESEARCH AND DEVELOPMENT

The Hydraulic-Based Spherical Robot is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email sscpac_T2@navy.mil. Reference Navy Case Number 100730.

BACKGROUND

Spherical robots are desirable for certain applications. Current spherical robots rely upon rotating mechanical weights inside the sphere to change the center gravity of the sphere, causing the robot to roll. The use of rotating mechanical weights is not optimal due to the reliance upon moving parts, which can present burdensome maintenance issues. It would be desirable, for certain applications, to have a spherical robot that does not rely on mechanical weights for propulsion.

DETAILED DESCRIPTION OF SOME EMBODIMENTS

Figure 1:
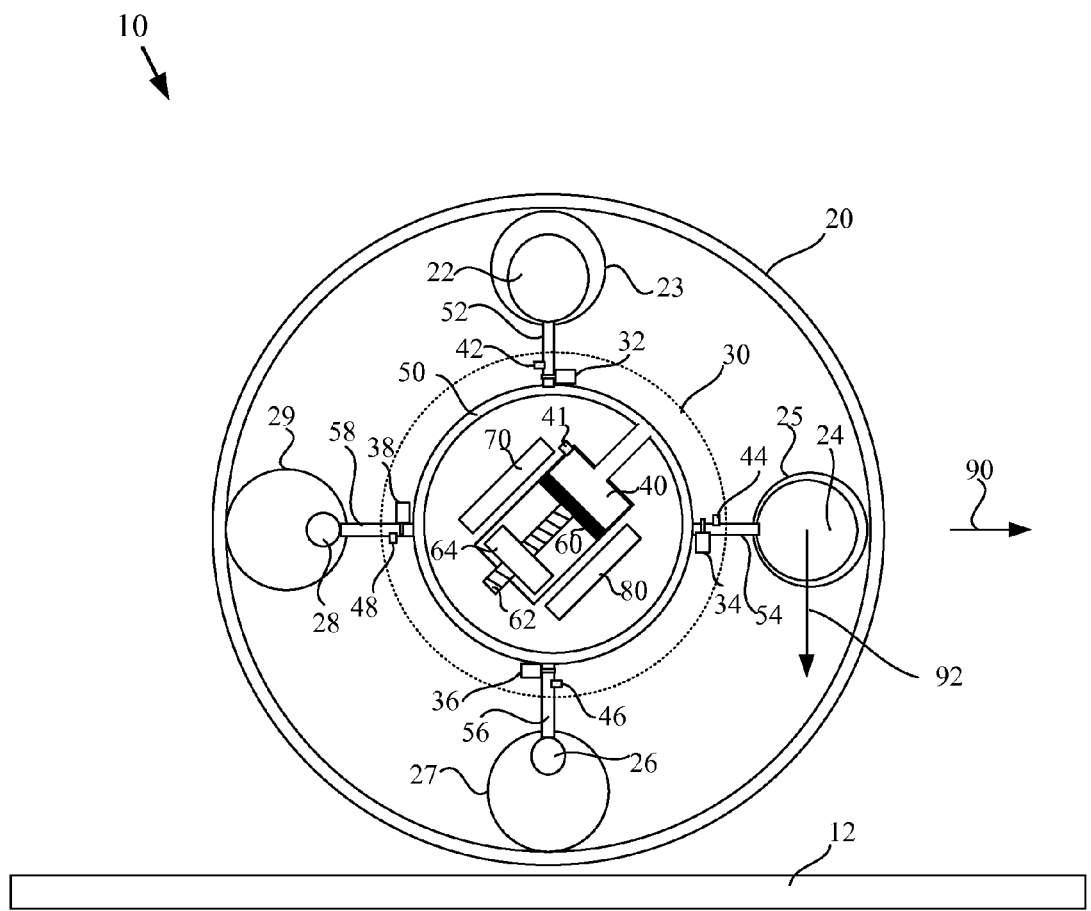
FIG. 1 shows a cross-section view of an embodiment of a system on a flat surface in accordance with the Hydraulic-Based Spherical Robot.

FIG. 1 shows a cross-section view of an embodiment of a system 10 on a surface 12 in accordance with the Hydraulic-Based Spherical Robot. System 10 may include an outer housing 20 and an inner housing 30. Outer housing 20 may be spherical in shape, or any other shape that allows system 10 to roll on a surface. Outer housing 20 may be formed of a lightweight and durable material, such as a polymer-based material. System 10 does not contain any parts, movable or non-movable, located external to outer housing 20.

Outer housing 20 contains a plurality of fluid chambers 22, 24, 26, and 28, which may be external to inner housing 30. Fluid chambers 22, 24, 26, and 28 are uniformly distributed about and in fluidic connection with a fluid reservoir 40. As used herein, the term "fluidic connection" means that, absent an external force caused for example by a valve, there is no barrier to prevent fluid from flowing between each of fluid chambers 22, 24, 26, and 28 and fluid reservoir 40. More or less fluid chambers may be incorporated into system 10 depending upon factors such as size requirements and the desired application. In some embodiments, fluid chambers 22, 24, 26, and 28 are expandable and are contained within a respective non-expandable fluid chamber housing 23, 25, 27, and 29.

Each fluid chamber 22, 24, 26, and 28 has a valve, such as valves 32, 34, 36, and 38, adjacent thereto, as well as a pressure sensor, such as pressure sensors 42, 44, 46, and 48, adjacent thereto. Each valve 32, 34, 36, and 38 is configured to allow fluid flow between fluid reservoir 40 and the respective fluid chamber 22, 24, 26, and 28. Each pressure sensor 42, 44, 46, and 48 is configured to determine the amount of fluid within the respective fluid chamber 22, 24, 26, and 28. In some embodiments, valves 32, 34, 36, and 38 and pressure sensors 42, 44, 46, and 48 may be connected directly to the respective fluid chamber 22, 24, 26, and 28, or the respective fluid chamber housing 23, 25, 27, and 29. In other embodiments, such as those configured similarly to the embodiment shown in FIG. 1, each fluid chamber 22, 24, 26, and 28 is connected to a fluid passage 50 via a respective fluid tube 52, 54, 56, and 58. In such embodiments, valves 32, 34, 36, and 38 and pressure sensors 42, 44, 46, and 48 may be connected to the respective fluid tube 52, 54, 56, and 58.

System 10 further includes a means, located adjacent to fluid reservoir 40, for pumping fluid between fluid reservoir 40 and each of the fluid chambers 22, 24, 26, and 28. As shown in FIG. 1, the means is a piston, comprising piston head 60 and piston shaft 62, connected to a motor 64. In other embodiments, the means for pumping fluid may comprise a pneumatic system, electric muscle wires, a mechatronic piezo, or chemical reaction force system. The piston and motor 64 may be secured within inner housing 30, for example, by brackets (not shown) connected to the inner surface of inner housing 30.

System 10 includes a controller 70 configured to control the means for pumping fluid and valves 32, 34, 36, and 38 using data received from pressure sensors 42, 44, 46, and 48. A power supply 80 is connected to the means for pumping fluid and the controller. Controller 70 and power supply 80 may be located within inner housing 30 and may be secured thereto by one or more brackets (not shown). In some embodiments, system 10 may be powered by a solar power supply 80. In such embodiments, power supply 80 may be located external to inner housing 50, such as coupled to or embedded within outer housing 20, with the appropriate electrical connections running to controller 70 and motor 64 within inner housing 30.

In some embodiments, fluid reservoir 40 may have a fluid reservoir pressure sensor 41 coupled thereto and configured to sense the pressure within fluid reservoir 40. In such embodiments, controller 70 uses data from fluid reservoir pressure sensor 41, in addition to data from pressure sensors 42, 44, 46, and 48, to control the means for pumping fluid and valves 32, 34, 36, and 38. System 10 may further include an RF transceiver, inertia measuring unit, and/or a camera operatively connected to controller 70 (see FIGS. 2 and 3).

The operation of system 10 will be discussed in relation to causing system 10 to move on surface 12, from a stand-still, in the direction indicated by arrow 90. Controller 70 may receive a signal, via an RF transceiver, such as RF transceiver 260 shown in FIG. 3, to move in the direction indicated by arrow 90. Controller 70 would then use information provided from pressure sensors 41, 42, 44, 46, and 48, as well as from the inertial measuring unit (if connected), to determine the orientation of fluid chambers 22, 24, 26, and 28 and the level of fluid within each fluid chamber. Controller 70 would then send signals to motor 64 and to open or close each of valves 32, 34, 36, and 38 depending upon where fluid from fluid reservoir 40 is to be directed. The operation of motor 64 and the opening/closing of valves 32, 34, 36, and 38 should be synchronous. The appropriate fluid chamber(s) are filled, causing the total center of gravity of system 10 to be altered, causing system 10 to roll in a particular direction.

As shown in FIG. 1, fluid chamber 24 is to be filled to the maximum extent to provide a downward force, as shown by arrow 92, to cause outer housing 20 to roll in a clockwise direction on surface 12. Also, fluid chamber 22 is to be filled, in conjunction with fluid chamber 24, to provide a similar force to cause a clockwise rotation. Controller 70 then sends a signal to motor 64 to cause motor 64 to force piston head 60 towards fluid reservoir 40 to pump fluid from fluid reservoir 40 into fluid passage 50. Since fluid chambers 22 and 24 are to be filled, controller 70 sends a signal to valves 32 and 34 to open. Thus, fluid will flow into fluid tubes 52 and 54 and then into fluid chambers 22 and 24, respectively. In this scenario, the signal to open valve 34 would be sent just before the signal to open valve 32, as fluid chamber 24 would need to start to fill before fluid chamber 22 to cause a rotational force on system 10.

Once system 10 begins to roll, controller 70 opens and closes valves 32, 34, 36, and 38 in an orderly fashion to either increase or decrease the speed of system 10. For example, during the rotation of fluid chamber 24 ninety degrees in a clockwise direction to when it is directly above surface 12, controller 70 will send a signal, based upon speed and orientation data received from inertia measuring unit (IMU) 270 (see FIG. 3), to motor 64 to pull piston head 60, and send a signal to open valve 34, causing fluid from fluid chamber 24 to be directed through fluid tube 54 and fluid passage 50 to fluid reservoir 40 to prevent a counter-clockwise rotational force from being imparted on system 10 as system 10 rolls in the direction of arrow 90. After the fluid has been completely released from fluid chamber 24, as determined by controller 70 using speed and orientation data received from IMU 270, controller 70 sends a signal to motor 64 push piston head 60, sends a signal to valve 34 to close valve 34, and sends a signal to valve 38 to open valve 38, causing the fluid from fluid reservoir 40 to be directed through fluid passage 50 and fluid tube 58 to the fluid chamber 180 degrees opposite from fluid chamber 24, which would be, in this instance, fluid chamber 28. Similarly, the fluid level of fluid chamber 22 will increase it rotates in a clockwise direction towards the former position of fluid chamber 24, with the fluid coming from fluid chamber 26 via the controller sending signals to motor 64 to open and close valve 32 and open valve 36 at the appropriate time similar to as discussed above with respect to valves 34 and 38. To slow down system 10, the aforementioned fluid flow would be reversed to cause system 10 to experience a counter-clockwise rotational force.

Figure 2:
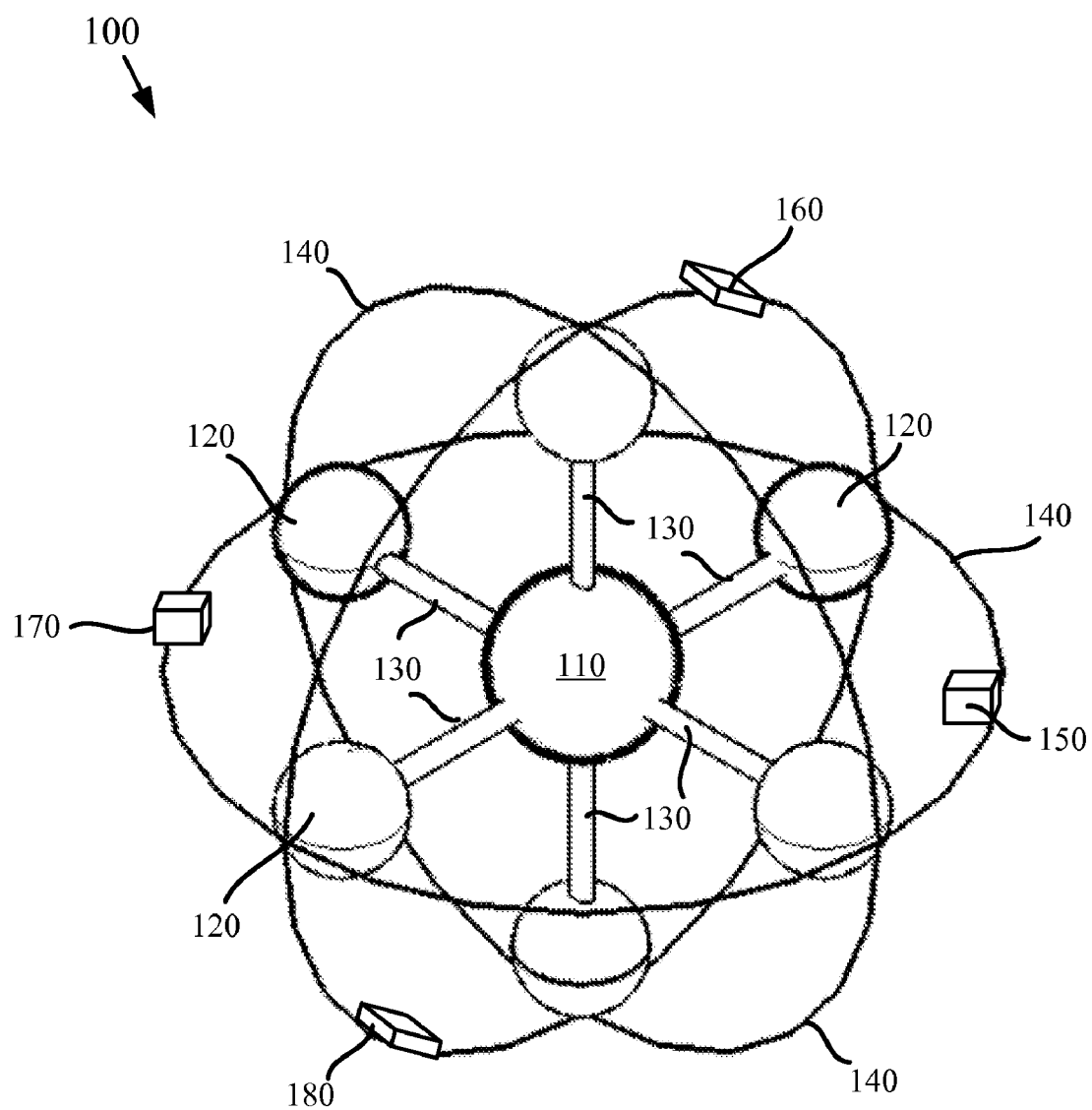
FIG. 2 shows a three-dimensional diagram illustrating a possible configuration of fluid chambers in a system in accordance with the Hydraulic-Based Spherical Robot.

Referring to FIG. 2, FIG. 2 shows a three-dimensional diagram illustrating a possible configuration of fluid chambers in a system 100 in accordance with the Hydraulic-Based Spherical Robot. System 100 includes an inner housing 110 and an outer housing represented by lines 140. Inner housing 110 may include all of the components of system 100 excluding fluid chambers 120 and fluid tubes 130, such as the valves, pressure sensors, fluid reservoir, means for pumping fluid, controller, and power source. Fluid tubes 130 are partially contained within inner housing 110 and are in fluidic connection with fluid chambers 120 and a fluid passage, such as fluid passage 50 shown in FIG. 1, which is in fluidic connection with a fluid reservoir. Such a fluidic connection allows fluid to readily flow, absent the valves being closed, between the fluid reservoir and the fluid chambers.

As shown, system 100 includes six fluid chambers 120 uniformly distributed about and away from inner housing 110. In some embodiments, fluid chambers 120 may be connected to outer housing 140, as shown. In such embodiments, fluid chambers 120 may be non-expandable fluid chambers comprised of a durable material. In other embodiments, fluid chambers 120 may comprise an expandable chamber located within a non-expandable fluid container, as shown in FIG. 1. System 100 may contain more or less fluid chambers 120, depending in part upon size and space considerations.

System 100 also may include other components that reside external to inner housing 110 and may be, for example, secured to the inner surface of outer housing 140. As an example, such components may include an RF transceiver 150, an inertia measuring unit (IMU) 160, a camera 170, and another sensor 180, such as an ambient sensor or a biochemical sensor. RF transceiver 150 provides communications means for system 100. As such, a user can send a signal to a controller via RF transceiver 150 to cause system 100 to move in a particular direction. Further, RF transceiver 150 may be used to transmit data, such as pictures, audio, or video, via a wireless connection to a user in a remote location.

IMU 160 may be, for example, any one or a combination of an accelerometer, gyroscope, and magnetometer for providing speed, direction, inertia, and/or orientation for system 100. Other sensors or components that are typically found in portable robots may be added to system 100 as recognized by one having ordinary skill in the art, with the appropriate modifications made to the software within the controller, the power supply, etc.

Figure 3:
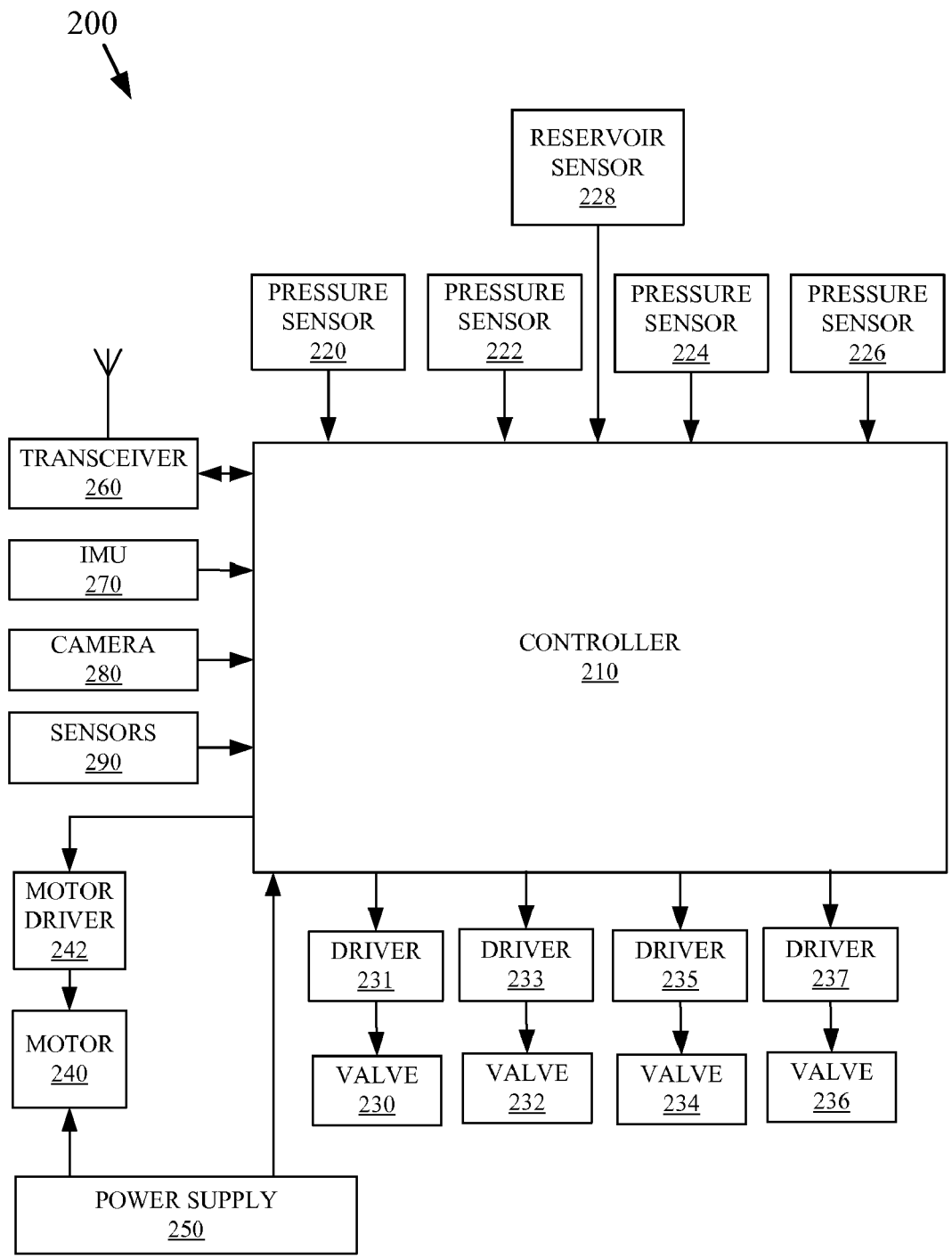
FIG. 3 shows a component diagram of an embodiment of a system in accordance with the Hydraulic-Based Spherical Robot.

FIG. 3 shows a component diagram of an embodiment of a system 200 in accordance with the Hydraulic-Based Spherical Robot. System 200 may represent the component diagram for embodiments of systems 10 and 100 shown in FIGS. 1 and 2, respectively. System 200 includes a controller 210, pressure sensors 220, 222, 224, 226, and reservoir pressure sensor 228, valves 230, 232, 234, and 236, with their respective associated drivers 231, 233, 235, and 237, a motor 240 with motor driver 242, a power supply 250, RF transceiver 260, IMU 270, camera 280, and other sensors 290. Components of system 200 with like names as components of system 10 and 100 may be configured similarly to those components. Other sensors 290 may comprise sensors such as a chemical/biochemical sensor, ambient sensor, or other sensors as are typically found on portable robots for particular applications or that are recognized by one having ordinary skill in the art.

Systems 10 and 200 as described herein may be manufactured in various sizes depending upon the desired application. For example, if system 10 is to be used as a projectile that can be launched from a canon or thrown by a user, system 10 would be designed to be the size of a softball. If system 10 is to be used for applications where it is not required for it to be readily user-transportable, system 10 may be designed with the radius of an automobile tire.

Many modifications and variations of the Hydraulic-Based Spherical Robot are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A system comprising:
   a plurality of fluid chambers uniformly distributed about and in fluidic connection with a fluid reservoir, each fluid chamber having a valve and pressure sensor adjacent thereto, the valve configured to allow fluid flow between the fluid reservoir and the fluid chamber and the pressure sensor configured to determine the amount of fluid within the respective fluid chamber;
   means, adjacent to the fluid reservoir, for pumping fluid between the fluid reservoir and each of the fluid chambers; and a controller configured to control the means for pumping fluid and the valves using data from the pressure sensors wherein the means for pumping fluid, the valves, the pressure sensors, and the controller are contained within an inner housing and the plurality of fluid chambers are contained within an outer housing and are external to the inner housing.

2. The system of claim 1, wherein the outer housing is spherical in shape.

3. The system of claim 1, wherein each of the fluid chambers is in fluidic connection with a fluid tube, wherein the fluid tubes are in fluidic connection with a fluid passage contained within the inner housing, the fluid passage being in fluidic connection with the fluid reservoir.

4. The system of claim 3, wherein the pressure sensor and valve for each fluid chamber are connected to each respective fluid tube.

5. The system of claim 1, wherein the means for pumping fluid is a piston connected to a motor.

6. The system of claim 1 further comprising a power supply connected to the means for pumping fluid and the controller.

7. The system of claim 1 further comprising a fluid reservoir pressure sensor coupled to the fluid reservoir.

8. The system of claim 1, wherein the fluid chambers are expandable.

9. The system of claim 8, wherein the fluid chambers are each contained within a non-expandable fluid chamber housing.

10. The system of claim 1 further comprising an RF transceiver connected to the controller.

11. The system of claim 1 further comprising an inertia measuring unit connected to the controller.

12. The system of claim 1 further comprising a camera connected to the controller.

13. A system comprising:
a plurality of expandable fluid chambers uniformly distributed about and in fluidic connection with a fluid reservoir, each expandable fluid chamber having a valve and pressure sensor adjacent thereto, the valve configured to allow fluid flow between the fluid reservoir and the expandable fluid chamber and the pressure sensor configured to determine the amount of fluid within the respective expandable fluid chamber;
a piston connected to a motor, adjacent to the fluid reservoir, for pumping fluid from the fluid reservoir to the each of the expandable fluid chambers;
a controller configured to control the means for pumping fluid and the valves using data from the sensors; and
a power supply connected to the means for pumping fluid and the controller
wherein the means for pumping fluid, the valves, the pressure sensors, and the controller are contained within an inner housing, and the plurality of expandable fluid chambers are contained within an outer housing and are external to the inner housing.

14. The system of claim 13, wherein each of the expandable fluid chambers is in fluidic connection with a fluid tube, wherein the fluid tubes are in fluidic connection with a fluid passage contained within the inner housing, the fluid passage being in fluidic connection with the fluid reservoir, wherein the pressure sensor and the valve for each expandable fluid chamber are connected to each respective fluid tube.

15. The system of claim 13 further comprising an RF transceiver connected to the controller.

16. The system of claim 13 further comprising an inertia measuring unit connected to the controller.

17. The system of claim 13 further comprising a camera connected to the controller.

18. A system comprising:
a plurality of expandable fluid chambers uniformly distributed about and in fluidic connection with a fluid reservoir, each expandable fluid chamber having a valve and pressure sensor adjacent thereto, the valve configured to allow fluid flow between the fluid reservoir and the expandable fluid chamber and the pressure sensor configured to determine the amount of fluid within the respective expandable fluid chamber;
a piston connected to a motor, adjacent to the fluid reservoir, for pumping fluid from the fluid reservoir to the each of the expandable fluid chambers;
a controller configured to control the means for pumping fluid and the liquid flow valves using information from the sensors;
a power supply connected to the means for pumping fluid and the controller; and
an RF transceiver, camera, and inertial measuring unit each connected to the controller
wherein the means for pumping fluid, the liquid control valves, the pressure sensors, and the controller are contained within an inner housing, and the plurality of expandable fluid chambers are contained within a spherical-shaped outer housing and are external to the inner housing
wherein each of the expandable fluid chambers is in fluidic connection with a fluid tube, wherein the fluid tubes are in fluidic connection with a fluid passage contained within the inner housing, the fluid passage being in fluidic connection with the fluid reservoir, wherein the pressure sensor and valve for each expandable fluid chamber are connected to each respective fluid tube.

19. The system of claim 18, wherein the expandable fluid chambers are each contained within a non-expandable fluid chamber housing.

20. The system of claim 18, wherein the outer housing is comprised of a durable polymer-based material.

* * * * *